(12) United States Patent
Schuetzle et al.

(10) Patent No.: US 9,090,831 B2
(45) Date of Patent: *Jul. 28, 2015

(54) CATALYST AND PROCESS FOR THE PRODUCTION OF DIESEL FUEL FROM NATURAL GAS, NATURAL GAS LIQUIDS, OR OTHER GASEOUS FEEDSTOCKS

(71) Applicant: Greyrock Energy, Inc., West Sacramento, CA (US)

(72) Inventors: Robert Schuetzle, Sacramento, CA (US); Dennis Schuetzle, Grass Valley, CA (US)

(73) Assignee: Greyrock Energy, Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/999,471

(22) Filed: Feb. 27, 2014

(65) Prior Publication Data

US 2014/0250770 A1 Sep. 11, 2014

Related U.S. Application Data

(60) Provisional application No. 61/851,479, filed on Mar. 8, 2013.

(51) Int. Cl.

| C07C 27/06 | (2006.01) |
|---|---|
| C10G 2/00 | (2006.01) |
| C10G 45/02 | (2006.01) |
| C10G 45/62 | (2006.01) |
| B01J 23/89 | (2006.01) |
| B01J 35/00 | (2006.01) |
| B01J 35/02 | (2006.01) |
| B01J 35/10 | (2006.01) |
| B01J 37/02 | (2006.01) |

(52) U.S. Cl.
CPC .............. *C10G 2/33* (2013.01); *B01J 23/8913* (2013.01); *B01J 35/0026* (2013.01); *B01J 35/0066* (2013.01); *B01J 35/023* (2013.01); *B01J 35/026* (2013.01); *B01J 35/1019* (2013.01); *B01J 35/1061* (2013.01); *B01J 37/0201* (2013.01); *C10G 2/32* (2013.01); *C10G 2/331* (2013.01); *C10G 45/02* (2013.01); *C10G 45/62* (2013.01); *C10G 2300/1022* (2013.01); *C10G 2400/04* (2013.01)

(58) Field of Classification Search
None
See application file for complete search history.

(56) References Cited

U.S. PATENT DOCUMENTS

| 2,546,017 | A | 3/1951 | Schiller et al. |
|---|---|---|---|
| 2,693,880 | A | 11/1954 | Schoenfeld |
| 4,495,307 | A | 1/1985 | Clements |
| 4,499,209 | A | 2/1985 | Hoek et al. |
| 5,229,347 | A | 7/1993 | Prada et al. |
| 5,620,670 | A | 4/1997 | Benham et al. |
| 6,262,131 | B1 | 7/2001 | Arcuri et al. |
| 7,404,936 | B2 | 7/2008 | Mazanec et al. |
| 8,394,862 | B1* | 3/2013 | Schuetzle et al. ............. 518/700 |
| 2003/0121826 | A1* | 7/2003 | Ding et al. ................. 208/120.1 |
| 2003/0134912 | A1* | 7/2003 | Ding et al. ..................... 518/715 |
| 2004/0173501 | A1* | 9/2004 | Lawson et al. .................. 208/15 |
| 2005/0166447 | A1 | 8/2005 | Corkwell et al. |
| 2006/0144755 | A1 | 7/2006 | Benazzi et al. |
| 2008/0108716 | A1 | 5/2008 | Ayasse |
| 2009/0300970 | A1 | 12/2009 | Perego et al. |
| 2010/0160463 | A1 | 6/2010 | Wang et al. |
| 2012/0208902 | A1 | 8/2012 | Kresnyak et al. |

\* cited by examiner

*Primary Examiner* — Sudhakar Katakam
(74) *Attorney, Agent, or Firm* — Jeffrey A. McKinney; McKinney Law Group APC

(57) ABSTRACT

A unique process and catalyst is described that operates efficiently for the direct production of a high cetane diesel type fuel or diesel type blending stock from stoichiometric mixtures of hydrogen and carbon monoxide. This invention allows for, but is not limited to, the economical and efficient production high quality diesel type fuels from small or distributed fuel production plants that have an annual production capacity of less than 10,000 barrels of product per day, by eliminating traditional wax upgrading processes. This catalytic process is ideal for distributed diesel fuel production plants such as gas to liquids production and other applications that require optimized economics based on supporting distributed feedstock resources.

15 Claims, 2 Drawing Sheets

US 9,090,831 B2

CATALYST AND PROCESS FOR THE PRODUCTION OF DIESEL FUEL FROM NATURAL GAS, NATURAL GAS LIQUIDS, OR OTHER GASEOUS FEEDSTOCKS

CROSS-REFERENCE TO RELATED APPLICATIONS

This application claims the benefit of U.S. Provisional Application 64/851,479 filed Mar. 8, 2013 and which is incorporated herein by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

This invention pertains generally to a unique process and catalyst system for the production of a premium diesel from synthesis gas that is produced from natural gas, natural gas liquids, carbon dioxide, or other similar feedstocks. The present invention pertains to catalytic processes that allow for the elimination of costly and complex wax cracking, hydroisomerization, and/or other upgrading and refining steps, commonly employed in traditional Gas to Liquids (or GTL), thus enabling the economical production of diesel fuel or diesel fuel blending stocks from distributed production plants that typically produce less than 10,000 barrels per day, although much larger plants can use these processes.

2. Description of Related Art

Global demand for energy continues to rise at a significant rate, particularly among developing industrialized nations. Natural gas, natural gas liquids, waste $CO_2$, associated stranded or flared gas, and combinations thereof are becoming more attractive as energy sources due to the increase in production of these gases worldwide.

It is known in the art that natural gas or other feedstocks outlined above can be converted into synthesis gas (or hydrogen and carbon monoxide) from a variety of known thermochemical conversion methods, including partial oxidation, auto-thermal reforming, steam methane reforming, dry reforming, and other practiced methods that are known in the art. Technologies for the production of syngas from other carbonaceous resources are also widely known and emerging processes are also under development.

The catalytic hydrogenation of carbon monoxide to produce light gases, liquids and waxes, ranging from methane to heavy hydrocarbons ($C_{100}$ and higher) in addition to oxygenated hydrocarbons, is typically referred to Fischer-Tropsch (or F-T) synthesis. Traditional F-T processes primarily produce a high weight (or wt. %) F-T wax ($C_{25}$ and higher) from the catalytic conversion process. These F-T waxes are then hydrocracked and/or further processed to produce diesel, naphtha, and other fractions. During this hydrocracking process, light hydrocarbons are also produced, which may require additional upgrading to produce viable products. Some of these processes are known and described in the art.

For example, U.S. Pat. No. 6,262,131 B1 (Syntroleum), issued Jul. 17, 2001, describes a structured Fischer-Tropsch catalyst system and method that includes at least one structure having a catalytic surface, such catalytic surface having a linear dimension exceeding 20 mm, a void ratio exceeding 0.6, and a contour that causes non-Taylor flow when CO and $H_2$ pass through the structure. F-T catalysts, including iron and cobalt, are described in the patent.

U.S. Pat. No. 7,404,936 (Velocys, Inc.) issued Jul. 29, 2008, describes a micro-channel reactor system and catalysts used in the micro-channel reactor system to produce heavy hydrocarbons from a syngas steam.

U.S. Pat. No. 4,499,209 (Shell Oil Company), issued Feb. 12, 1985, describes a Fischer-Tropsch catalyst prepared by impregnation of a silica carrier with a solution of zirconium and titanium, followed by calcination and other preparation steps.

U.S. Pat. No. 5,620,670 (Rentech, Inc.), issued Apr. 15, 1997, describes a catalytic process converting hydrogen and carbon monoxide in a Fischer-Tropsch synthesis reactor using a promoted iron oxide catalyst slurry.

These patents describe catalysts that form high hydrocarbon reaction products (e.g., wax) that require further processing, including hydroprocessing and other upgrading processes, to produce diesel fuel or diesel blendstock ($C_8$-$C_{24}$).

Hydrocracking and other upgrading processes add significant expense and complexity to a plant design. Such processes can be justified for large, refinery scale plants such as traditional gas to liquids plants. However for smaller, distributed applications that require lower volumes of feedstock for gas-to-liquids (GTL), and other plants that produce less than approximately 10,000 barrels per day, plant designs that incorporate traditional F-T processes that include hydrocracking and other expensive upgrading processes may not be economically viable. To date, F-T type catalyst and catalytic process plant designs have not been available to support these smaller, distributed applications.

Accordingly, there is an increasing need for a catalytic process that can directly convert syngas into a diesel fuel with a high yield at relatively low cost under mild operating conditions. There is also a need for a catalytic process that does not require traditional major traditional hydrocracking and upgrading steps, thus enabling the economic production of distributed GTL. The present invention meets these needs as well as others and provides a substantial improvement over the prior art.

BRIEF SUMMARY OF THE INVENTION

Embodiments of the present invention provide a catalytic process using a catalyst to directly produce a diesel fuel from syngas at high yields, where the catalytic process produces primarily diesel fuel with some light wax. The light wax is first distilled to remove any diesel fuel range products and the remaining light wax from the distillation process is then recycled back to the syngas production step whereby additional syngas is produced for the subsequent production of additional diesel fuel.

Traditional F-T processes before hydroprocessing or upgrading produce a majority of wax and only a small amount or no diesel fuel and then require major unit operations in order to produce fuels suitable for sale into the market. Thus, producing a product fraction with a majority in the diesel fuel range with the balance of the non-gas phase products involving a light wax, without requiring major traditional hydroprocessing or other upgrading steps, requires a significantly different catalyst and process than has been used in the past.

Typical raw products of F-T synthesis include a majority of waxes, and are hydroprocessed to reduce boiling point. As part of this process hydroprocessing removes the oxygenates produced during the process by converting them to corresponding paraffins. The complete removal of oxygenates including high molecular weight linear alcohols is undesirable since these alcohols provide good lubricity properties.

Using the supported catalyst and process described herein, the catalytic process can produce a product distribution that comprises approximately ⅔ of the liquid product in the diesel fuel range comprising a majority of hydrocarbons in the C8-C24 range. The balance of the non-gas phase material consists of a light wax that can be easily processed into diesel fuel range hydrocarbons or recycled back to the syngas generator to produce additional syngas.

Post processing or recycling of the remaining wax fraction enable the production of 100% diesel fuel using the proposed process. The light wax after distillation produced from this process is unique in that the hydrocarbons contained in the wax consist of no greater than 0.5 wt. % of each carbon number greater than C35 (for example, each carbon number C35, C36, etc. each consist of no greater than 0.5% wt. %).

Embodiments of the invention provide desirable combinations of variables to produce a process and catalysts that produce a high diesel fraction yield directly from syngas.

A variety of catalyst parameters of the catalyst makes it unique and allow for efficient operation. Structural parameters include support material which may include $Al_2O_3$, $SiO_2$, activated carbon, carbon nanotubes, zeolites, or other support materials size, shape, pore diameter, surface area, crush strength, effective pellet radius, and other parameters as described herein.

A unique combination of these parameters provide for an effective catalyst that produces the unique product. Procedures for the reduction of the catalyst and the type of reactor used in the process are also important factors that determine selectivity to product.

As has been shown through testing, variations of the parameters mentioned above can have a dramatic effect on product distribution in some embodiments. For example, finding the optimal support, metals loading, crystalline size, pore diameter, surface area, crush strength, and effective pellet radius of a supported catalyst can change the product distribution and can make a difference between an economical distributed plant and one that requires expensive upgrading processes. Further, the reduction procedures and type of reactor used in the process are integral to obtaining the desired yields.

In one aspect of the invention, the process comprises reacting a feed gas (e.g., syngas, cleaned up syngas, and others) with a supported catalyst to produce a product stream comprising diesel fuel, gases and a light wax, wherein after the light wax fraction is distilled, the distribution of the product approximates greater than ⅔ diesel fuel and approximately less than ⅓ wax out of the non-gas phase components.

In one embodiment of the invention, the light wax is distilled as part of the integrated process whereby the light wax fraction is fed into a distillation column whereby the distillation column is operated to produce a usable diesel fuel fraction in the approximate C8-C24 range which is blended with the diesel fuel fraction directly produced by the catalyst.

In another embodiment of the invention, an overhead stream, a bottom stream, and at least one side stream are withdrawn from the distillation column. The diesel fuel produced from the distillation process is an ideal synthetic diesel that meets ASTM specifications including flash point, D90 distillation.

In another embodiment of the invention, the distillation column is fed both the light wax and liquid fraction produced from the catalyst and the distillation column is operated to produce three streams including a naphtha fraction (approximately C4-C7), a diesel fuel fraction (approximately C8-C24 range), and a wax fraction (approximately C25+).

In another embodiment of the invention, the naphtha fraction is recycled back to the syngas generation unit to produce additional syngas that is subsequently used to produce more diesel fuel as described herein.

In another embodiment of the invention, the remaining wax fraction is recycled back to the syngas generation unit to produce additional syngas that is subsequently used to produce more diesel fuel as described herein.

In another embodiment of the invention, the wax that is recycled back to the syngas generation unit whereby the syngas generation unit is a non-catalytic partial oxidation (POX) system and the wax is converted along with the primary feedstock which may be natural gas, natural gas liquids, or combinations thereof.

In another embodiment of the invention, the naphtha fraction from the distillation unit is also recycled and converted along with the wax and primary feedstock into syngas.

In embodiments of the invention, the metal catalyst may be cobalt, iron, nickel, or a combination of these metals deposited at greater than 5 weight percent (wt. %) on gamma alumina, silica, or another support material along with one or more promoters at about 0.01 wt. % to about 10 wt. %, based on the total weight of the supported catalyst.

The promoters may include one or more of the following: cerium, ruthenium, lanthanum, platinum, rhenium, gold, nickel, or rhodium. In one embodiment of the invention, the catalyst has a mean pore diameter greater than 8 nm. The catalyst may be a lobed extrudate, a sphere, granule, or other shape that allows for efficient operation in a catalyst bed. Ideally, the lobed support consisting of either three, four, or five lobes with two or more of the lobes being longer and the other two shorter, with both the longer lobes being symmetric and the shorter lobes being symmetric.

The distance from the mid-point of the support or the mid-point of each lobe is called the "effective pellet radius" which is an important parameter to achieve the desired selectivity to diesel fuel product.

Production methods of the catalyst include impregnation and other methods of production commonly used in the industry and are described in the art.

Conventional high surface area catalyst supports have an average pore diameter less than 100 angstroms. Supports that have been engineered to have an average pore volume greater than 40 cc/g or an average pore diameter greater than 80 angstroms will have surface area much lower than 150 $m^2$/g and crush strength will be below 2 lbs/mm. Achieving the above combination of variables is unique in the art (i.e. the unique combination of high surface area, large pore volume and pore diameter, and sufficient crush strength). To ensure a crush strength as high as 2 lbs/mm, the carrier would have to be calcined at very high temperatures (>1,800 F) at the expense of losing substantial surface area.

The catalyst support used has an average pore diameter greater than about 80 angstroms, a mean effective pellet radius less than 600 microns, a crush strength of greater than 3 lbs/mm, and a BET surface area of greater than 150 $m^2$/g and a dispersion value of 4%. This combination of variables is unique.

Support types that have been found to be of benefit to maximizing diesel fuel yield include alumina, alumina/silica combinations, activated carbon, carbon nanotubes, carbon nanofibers, and/or zeolite based supports.

It has been discovered that the supported catalyst in accordance with the present invention, when used in a fixed bed reactor and using a unique in-situ reduction process is very effective and produces a high selectivity to diesel type fuel product.

The diesel fuel produced from the process in accordance with the present invention is ideal for blending with a petroleum diesel to improve its cetane content and to reduce sulfur in the blended fuel. The diesel fuel has lubricity ranging from 200 micron to 475 micron per ASTM D6079.

A further aspect of this invention is to splash blend the diesel fuel with a small percentage of cold flow improver such that it can meet specifications for neat fuel operation in cold climates.

BRIEF DESCRIPTION OF THE DRAWINGS

The invention will be more fully understood by reference to the following drawings which are for illustrative purposes only.

DETAILED DESCRIPTION OF THE INVENTION

Figure 1:
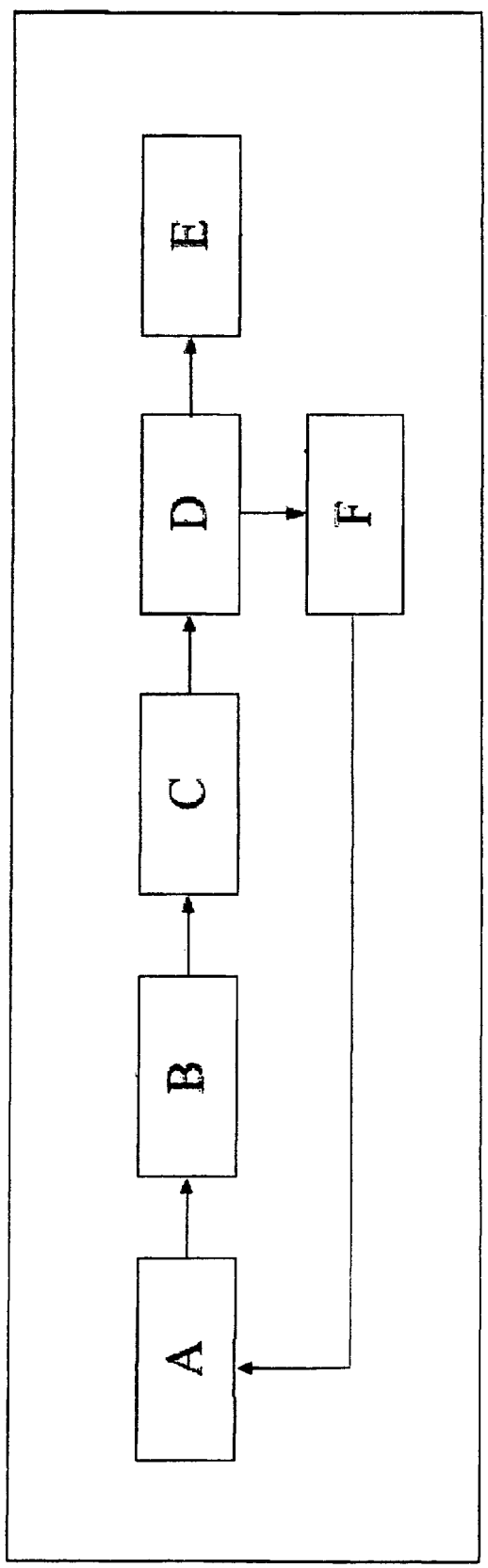
FIG. 1 shows a process flow diagram with Items A through E, each of which presenting different process steps from the production of syngas to processing a diesel fuel.

Embodiments of the present invention provide a catalytic process that produces diesel type fuels (which include a majority of $C_8$-$C_{24}$ hydrocarbons) with high selectivity, while minimizing F-T wax (which includes a majority of $C_{25}^+$ hydrocarbons) production using a unique catalyst and process. In this context, "selectivity" refers to moles of referenced fuel product formed per mole of CO converted.

In the preferred embodiment described herein, the product is a diesel type fuel or diesel type fuel blendstock consisting of majority of $C_8$-$C_{24}$ hydrocarbons and a minimal amount of wax ($C_{24}$+) whereby the wax produced is a wax produced from this process is unique in that the hydrocarbons contained in the wax consist of no greater than 0.5 wt. % of each carbon number greater than C35 (for example, each carbon number C35, C36, etc. each consist of no greater than 0.5% wt. %).

Hereinafter, the diesel fuel or diesel blendstock fraction that consists of hydrocarbons with a majority in the $C_8$-$C_{24}$ range is referred to as "diesel fuel." A process in accordance with the present invention described herein produces a non-gas product distribution of about ⅔ diesel fuel and about ⅓ light wax.

The product produced directly from the application of this invention is a high cetane diesel type fuel or high cetane diesel type fuel blendstock. Contrary to the traditional F-T product, in embodiments of the invention, the diesel fuel can be produced directly from syngas at high yields by passing the syngas through a F-T reactor in a single pass or by operating reactors in series to achieve a high overall carbon conversion. In other embodiments, unconverted syngas is recycled to the head of the reactor and blended with incoming feed gas.

The diesel fuel is liquid under ambient conditions (e.g., at 72° F. and atmospheric pressure). The liquid hydrocarbon product of the present catalytic reaction that is produced from F-T catalytic reaction can be used directly as a diesel blending stock or as a neat fuel without a need to employ costly refining or upgrading processes. The blendstock improves cetane number and reduces sulfur of typical petroleum derived diesel fuels. The blendstock also has superior lubricity properties. If the original feedstock from the syngas production is renewable such as derived from a bio-gas, the blendstock may also provide a beneficial low carbon component when blended with petroleum derived fuels.

Following the catalytic production process, product fractions are separated using a series of condensers or "knock out vessels". For example, in other F-T process, a wax product is first condensed in a knock out vessel that is operated at 300° F.-420° F. The liquid and water fractions are then condensed out in a second vessel at or below ambient conditions (80° F. or below).

In order to produce the ideal fraction of products, in another embodiment of the invention distillation is used to produce the desired product cuts from direct effluent from the catalytic reaction. This distillation column may contain as few as 5 plates or as many as 40 plates and may be run at a variety of temperatures ranging to efficiently produce the desired product fractions.

Embodiments of the invention also provide for the recycling of by-product streams such as naphtha and wax which are gasified or reformed to produce additional syngas which is then subsequently used to produce more diesel fuel.

Embodiments of the invention include recycling wax back to the syngas generation unit whereby the syngas generation unit is a non-catalytic partial oxidation (POX) system and the wax is converted along with the primary feedstock which may be natural gas, natural gas liquids, or combinations thereof. Recycling these byproduct steams back to produce additional syngas enables production of 100% diesel fuel.

Embodiments of the invention provide several advantages. The diesel type fuels produced in accordance with the present invention are ideal as current diesel fuel blend-stocks since such blending improves cetane number, lowers fuel sulfur content, and lowers engine emissions. The diesel fuel product can be used a neat fuel, as a blend, or can either be mildly isomerized or splash blended with a cold flow improver to meet specifications for low temperature climates.

Furthermore, maximization of the $C_8$-$C_{24}$ selectivity for the diesel type fuel fraction allows elimination of costly upgrading processes for this fuel fraction. Thus, embodiments of the present invention enable the economic production of distributed gas to liquids plants that produce less than approximately 10,000 barrels of fuels per year, however much larger plant designs are possible.

Referring more specifically to the drawings, FIG. 1 illustrates a schematic flow diagram with Items A through E, each of which represents a different process step, starting with the production of a syngas feed to the processing of a diesel fuel.

In FIG. 1, Item A refers to any process that produces a syngas feed, which may include steam reforming, autothermal reforming, catalytic partial oxidation (CPOX), non-catalytic partial oxidation, dry reforming, or other methods known in the art, as well as emerging processes that are being developed as economical ways to produce syngas from renewable, fossil, and other resources.

Item B represents syngas cleanup and conditioning processes. Clean syngas free of impurities (which may affect catalyst performance and lifetime) is necessary for efficient and economical operation. Impurities may include hydrogen sulfide, ammonia, chlorides, and other contaminants that result from a syngas production process. Syngas cleanup processes are well known and described in the art. For example, syngas cleanup processes may include sulfur clean up catalysts, particulate filters, and other technologies to produce clean syngas for subsequent conversion to fuels.

Item C represents the conversion of syngas into a product gas stream which results in a product mixture containing F-T liquids, light gases, and wax. The present invention relates to the catalyst used in this process step and the corresponding operating conditions required for efficient operation during this process step.

Item D includes product separation processes whereby the liquid and wax products are condensed out of the product gas stream and the light gases are recycled back to the catalytic reactor and/or may be used for power production or other parasitic load requirements. Item D may also include condensing out the product gas stream into a product mixture comprising diesel, water, and wax in a single knock out vessel wherein the wax stays entrained in the water fraction for ease of separation from the diesel fuel fraction.

Item E may also represent another optional step, where a small percentage of a cold flow improver or other additives are blended into the diesel fuel fraction in order to help cold flow properties of the fuel for use in cold climates.

Item F represents a step whereby the remaining wax and/or the naphtha fraction may be recycled back to the syngas generation unit whereby more syngas is produced from the wax and/or the naphtha products. Ideally, the naphtha and wax fractions are converted in addition to the natural gas and/or natural gas liquids primary feedstocks using a partial oxidation system.

In F-T synthesis which occurs in Item C, hydrocarbon product selectivity depends on diffusion, reaction, and convection processes occurring within the catalyst pellets (i.e., supported catalyst) and reactor. In embodiments of the invention, catalyst pellets or supported catalyst refer to a catalyst (which is typically a metal) dispersed on suitable support material or pellets. The characteristics of a supported catalyst that affect a product distribution (e.g., the proportion of a diesel fuel and wax) include structural parameters, such as an effective pellet radius and pore diameter of the support material, in addition to operating conditions of the catalyst.

Figure 2:
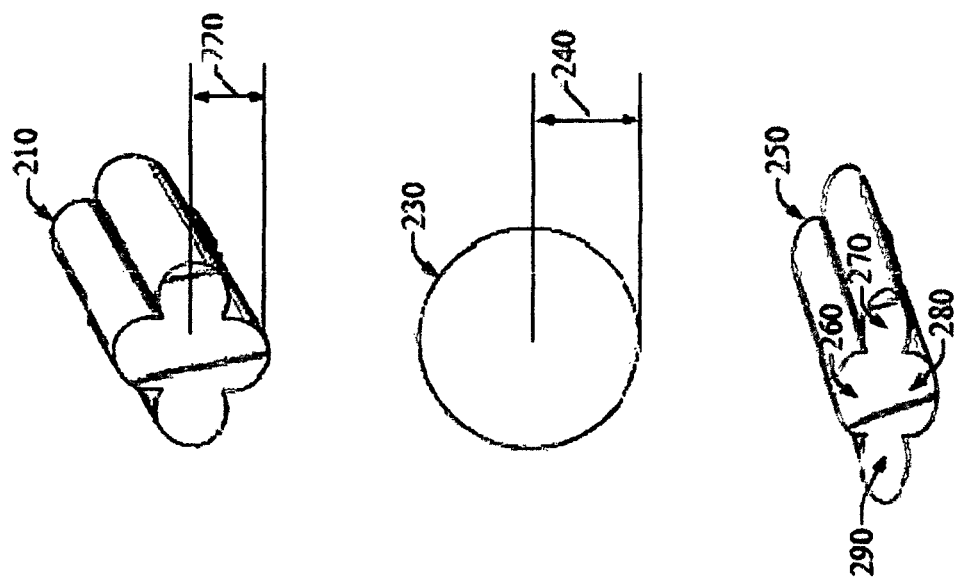
FIG. 2 shows the effective pellet radius of a lobed and a spherical support and also shows different sized lobes on the lobed catalyst.

FIG. 2 illustrates examples of shapes of pellets (i.e., support or support materials) which may be used to support a catalyst in the F-T process which occurs in Item C. FIG. 2 shows a lobed catalyst which may be used in embodiments of the invention. Support material with other shapes may also be used.

The catalyst shape is ideally an extrudate with a lobed, fluted, or vaned cross section but could also be a sphere, granule, powder, or other support shape that allows for efficient operation. The use of a lobed structure, for example, enables a significant increase in the ratio of area to volume in the catalytic reactor, thus improving the volumetric efficiency of a catalytic reactor system. The lobed structures also provide an improved pressure drop, which translates into a lower difference in the pressure upstream and downstream of the catalyst bed, especially when they are used in fixed bed reactors.

FIG. 2 also illustrates how the effective pellet radius of a support material is defined. For a cylindrical support (230) the effective pellet radius is shown (240). For a lobed support (210) the effective pellet radius is shown (220). The effective pellet radius of a pellet or support refers to the maximum radius which is a distance from the mid-point of the support to the surface of the support. For lobed supports, the effective pellet radius refers to the minimum distance between the mid-point and the outer surface portion of the pellet as shown. In embodiments of the invention, the effective pellet radius may be about 600 microns or less. In one embodiment, the effective pellet radius may be about 300 microns or less.

In embodiments of the invention, the pellet or support material may be porous. The mean pore diameter of the support material may be greater than 100 angstroms. In one embodiment, the pellet or support material may have a mean pore diameter greater than about 80 angstroms.

Any suitable material can be used as a support material in the Fischer-Tropsch process. These include metal oxides, such as alumina, silica, zirconia, magnesium, or combinations of these materials. Preferably, alumina is used as a support material to make a supported catalyst.

The catalytically active metals, which are included with or dispersed to the support material, include substances which promote the production of diesel fuel in the Fischer-Tropsch reaction. For example, these metals include cobalt, iron, nickel, or any combinations thereof. Various promoters may be also added to the support material. Examples of promoters include cerium, ruthenium, lanthanum, platinum, rhenium, gold, nickel, or rhodium.

The catalyst support ideally has a crush strength of between than 3 lbs/mm and 4 lbs/mm and a BET surface area of greater than 150 m$^2$/g. This combination of variables is unique. Conventional high surface area supports have an average pore diameter less than 100 angstroms.

Supports that have been engineered to have a large average pore volume greater than 80 angstroms will have surface area much lower than 150 m$^2$/g and crush strength will be below 2 lbs/mm despite additional calcination or heat treatment. Achieving the above combination of variables is unique in the art. This is achieved with the addition of a structural stabilizer that provides additional crystallinity (for example silicon or silica oxide) and thus more strength upon heat treatment.

The active metal distribution on the support is ideally between about 2% and about 10%, preferably about 4%. The active metal dispersion is the fraction of the atoms on the catalyst surface that are exposed as expressed by:

$$D = N_S/N_T,$$

where D is the dispersion, $N_S$ is the number of surface atoms, and $N_T$ is the total number of atoms of the material. Dispersion increases with decreasing crystallite size.

In one embodiment, a supported catalyst includes cobalt, iron, or nickel deposited at between about 5 weight % and 30 weight % on gamma alumina, more typically about 20 weight % on gamma alumina, based on the total weight of the supported catalyst. Also, the supported catalyst formulation includes selected combinations of one or more promoters consisting of ruthenium, palladium, platinum, gold nickel, rhenium, and combinations in about 0.01-20.0 weight % range, more typically in about 0.1-0.5 weight % range per promoter. Production methods of the catalyst include impregnation and other methods of production commonly used in the industry and are described in the art.

Fischer-Tropsch supported catalysts are generally used in either a fixed bed or a slurry bed reactor. In a fixed bed reactor, the supported catalysts are packed within tubes or may be spread across a tray or packed into a number of channels, or any other fixed bed reactor design whereby the reaction gas is evenly distributed and flows over the catalyst in the bed. In one embodiment, the catalyst is loaded in a multi-tubular fixed bed reactor, with each tube in a shell design with one inch diameter. In one embodiment, the catalyst is reduced in-situ in the multi-tubular fixed bed reactor at temperatures below 650 F. Typical Fischer-Tropsch catalysts are reduced ex-situ (before loading into the reactor) and at temperatures above 650 F, and can be as high as 850 F. The use of a unique low temperature, in-situ reduction procedure is unique in the art with this catalyst.

The operating parameters of the supported catalyst are selected to achieve the desired selectivity of diesel fuel. The Fischer-Tropsch reaction in embodiments of the invention is typically kept at pressures between 150 psi and 450 psi. The Fischer-Tropsch reaction is operated at temperatures between about 350 F and 460 F, more typically around 410° F.

FIG. 2 also shows a lobed support with lobes of different sizes (250). Lobes marked as 270 and 290 denote the longer lobes and lobes marked with 260 and 280 denote the shorter lobes. This type of support allows for more efficient catalyst bed packing, better pressure drop characteristics, and higher diesel fuel to wax production ratios using the invention described herein.

Optionally, the diesel fuel fraction can be further processed to improve its cold flow properties (e.g., cold pour properties). In some market areas, it is desired that the low temperature properties of the diesel fuel are improved to optimize the performance of diesel fueled vehicles in cold weather.

In one embodiment, the light wax fraction can be further reacted with a catalyst which performs mild cracking of the wax to diesel fuel. An example of a suitable reactor is a trickle bed reactor.

In the preferred embodiment described herein, the product is a diesel type fuel or diesel type fuel blendstock consisting of majority of $C_8$-$C_{24}$ hydrocarbons and a minimal amount of wax ($C_{24}$+) whereby the wax produced is a light wax produced from this process is unique in that the hydrocarbons contained in the wax consist of no greater than 0.5 wt. % of each carbon number greater than C35 (for example, each carbon number C35, C36, etc. each consist of no greater than 0.5% wt. %).

Wax cracking reactors are generally operated at pressures in the range of about 100 psi to about 400 psi, preferably at about 150 psi. The reactor is kept at a temperature between about 300° F. to about 600° F., preferably at about 425° F.

In another embodiment, a cold flow improver may be blended with the diesel fuel fraction to improve cold flow properties of the diesel fuel. Cold flow improvers are added to diesel fuel in an amount from 100 to 5,000 ppm to lower the pour point and freezing point properties. These pour point depressants typically consist of oil-soluble copolymers such as ethylene vinyl acetate copolymers (EVA), esters of styrene-malefic anhydride copolymers, polymethyl-methacrylate copolymers and alkyl-methacrylate copolymers.

Example #1

Supported catalysts are prepared using an incipient wetness procedure whereby cobalt and promoter metals are impregnated on a gamma alumina, quad-lobed support with a mean effective pellet radius of 0.25 mm and a mean pore diameter of 130 Angstroms. The surface area of the catalyst is 110 m2/g as measured by BET/$N_2$ physisorption technique. The crush strength of the catalyst is 4 lbs/mm. Drying and calcination steps are used in the production process to produce a catalyst with 20 wt % cobalt and 0.3 wt % platinum promoter. Following the production of the supported catalysts, the supported catalysts are loaded in a multi-tubular fixed bed reactor of a tube in shell design with 1" (2.54 cm) diameter tubes. The catalyst is reduced with hydrogen at 75 psig and at a temperature less than 650° F. which are operating conditions that can be achieved in a fixed bed reactor that can be manufactured inexpensively.

In an alternative embodiment, the catalyst is reduced with a syngas feed with a high $H_2$/CO ratio under the same conditions. Reduction with syngas (instead of $H_2$) reduces commercial operating costs, especially in remote areas where smaller, distributed plants are sited. While in-situ reduction is highlighted in this example, other reduction procedures, including ex-situ options, can be used.

Following reduction, the supported catalysts are contacted with syngas with $H_2$ and CO at a ratio of 2.05:1.0 ($H_2$:CO), at a pressure of 400 psi, and at a temperature of 410° F.

Following the catalytic conversion step, the diesel fuel fraction and the wax and water fraction are separated out from the light hydrocarbon gases and unreacted CO and $H_2$ in a single knock out vessel at temperatures below 70° F. The separated liquid product fraction includes a diesel fuel fraction on top and a water fraction. A separator vessel with an internal vane is used to separate the diesel fuel fraction from the water. The wax is further distilled to extract an additional diesel fuel fraction.

The catalyst system under these operating conditions produces a diesel fuel to wax ratio of ⅔ diesel fuel and ⅓ light wax (following distillation). In the preferred embodiment described herein, the product is a diesel type fuel or diesel type fuel blendstock consisting of majority of $C_8$-$C_{24}$ hydrocarbons and a minimal amount of wax ($C_{24}$+) whereby the wax produced is a light wax produced from this process is unique in that the hydrocarbons contained in the wax consist of no greater than 0.5 wt. % of each carbon number greater than C35 (for example, each carbon number C35, C36, etc. each consist of no greater than 0.5% wt. %).

The diesel fuel can be ideally used as a diesel fuel blendstock providing a petroleum derived diesel fuel with an improvement in cetane, reduction in sulfur, and in some cases (based on the method of syngas production) can be used as a low carbon blendstock.

The wax is recycled back to the syngas production process and is used as an input to create additional syngas, thus improving overall conversion efficiencies of the integrated system.

Example #2

In this example, a majority of diesel fuel is desired as product output from the plant. The same catalyst system and processes are used as described above in Example #1. Following the catalyst synthesis process, the light wax fraction is contacted with a catalyst that performs hydrocarbon cracking under mild operating conditions. In this example, the catalyst used is a platinum promoted catalyst.

In this example, a trickle bed reactor is used; however, other known reactors can be used as well. The reactor is operated in a pressure range of about 100 psi to about 400 psi, ideally at 150 psi in a temperature range of about 350° F. to about 600° F., preferably at 425° F. The $H_2$/wax molar ratio is in the range of 1.5-5, preferably equal to 2.

The output product converts up to about 75% of the normal paraffins to diesel fuel with a high selectivity, thus creating another diesel product steam that can be blended with the output from the first catalyst system.

Example #3

The cold flow properties of a diesel fuel fraction are improved by splash blending the diesel fuel fraction with a cold flow improver. The same catalyst system and processes are used as described above in Example #1. Following the catalyst synthesis process, the diesel fuel fraction is splash blended with a cold flow improver that is blended at 2000 ppm and consists of alkyl-methacrylate copolymers.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

All publications, patents and patent applications cited herein are hereby incorporated by reference for all purposes in their entirety.

What is claimed is:

1. A process for the production of a hydrocarbon mixture comprising the steps of:
   a) reducing a supported catalyst to provide a reduced catalyst;
   b) using the reduced catalyst in a fixed bed reactor;
   c) reacting a feed gas that contains hydrogen and carbon monoxide with the reduced catalyst to produce a hydrocarbon product stream, wherein the hydrocarbon product stream comprises light gases, diesel fuel and a wax;
   d) condensing the diesel fuel and wax, wherein the diesel fuel comprises more than ⅔ of the diesel fuel and wax together, and wherein a majority of hydrocarbons in the diesel fuel are C8-C24 hydrocarbons.

2. The process of claim 1, wherein the catalyst has:
   a pore diameter greater than 80 angstroms and;
   a crush strength of greater than 3 lbs/mm and;
   a BET surface area of greater than 110 m2/g;
   a dispersion value between 2% and 10%.

3. The process of claim 1, wherein the supported catalyst comprises a lobed support with more than four lobes and an effective pellet radius of less than 600 microns.

4. The process of claim 1, wherein the supported catalyst further comprises about 0.01 weight percent to about 2.0 weight percent of a promoter selected from the group consisting of cerium, ruthenium, lanthanum, platinum, rhenium, gold, nickel, or rhodium and a combination thereof.

5. The process of claim 1, wherein the catalyst is supported on alumina.

6. The process of claim 1, wherein the diesel fuel and wax are condensed into a single vessel.

7. A process for the production of a hydrocarbon mixture comprising the steps of:
   a) reducing an alumina supported catalyst, wherein the catalyst includes cobalt as a catalytically active metal, to provide a reduced catalyst;
   b) using the reduced catalyst in a fixed bed reactor;
   c) reacting a feed gas that contains hydrogen and carbon monoxide with the reduced catalyst to produce a hydrocarbon product stream, wherein the hydrocarbon product stream comprises light gases, diesel fuel and a wax, wherein a majority of hydrocarbons in the diesel fuel are C8-C24 hydrocarbons,
   and wherein the diesel fuel is produced without the hydroprocessing of wax.

8. The process of claim 7, wherein the catalyst has a pore diameter greater than 80 angstroms, a crush strength greater than 3 lbs/mm, a BET surface area of greater than 110 m2/g, and a dispersion value between 2% and 10%.

9. The process of claim 7, wherein the supported catalyst comprises a lobed support, and wherein the supported catalyst comprises about 0.01 weight percent to about 2.0 weight percent of a promoter selected from a group consisting of cerium, ruthenium, lanthanum, platinum, rhenium, gold, nickel or rhodium and a combination thereof.

10. The process of claim 7, wherein the diesel fuel and wax are condensed into a single vessel.

11. The process according to claim 7, wherein the supported catalyst comprises a lobed support, and wherein the supported catalyst comprises about 0.01 weight percent to about 2.0 weight percent of a promoter selected from a group consisting of cerium, ruthenium, lanthanum, platinum, rhenium, gold, nickel or rhodium and a combination thereof.

12. A process for the production of a hydrocarbon mixture comprising the steps of:
   a) reducing an alumina supported catalyst, wherein the catalyst includes cobalt as a catalytically active metal, in-situ in a fixed bed reactor to provide a reduced catalyst;
   b) using the reduced catalyst in a fixed bed reactor;
   c) reacting a feed gas that contains hydrogen and carbon monoxide with the reduced catalyst to produce a hydrocarbon product stream, wherein the hydrocarbon product stream comprises light gases, diesel fuel and a wax;
   d) introducing the product stream into a single vessel and condensing the product stream into two liquid fractions in the single vessel, wherein the two liquid fractions are a top fraction and a bottom fraction, and wherein the top fraction contains the diesel fuel and the bottom fraction contains water.

13. The process according to claim 12, wherein the catalyst has a pore diameter greater than 80 angstroms, a crush strength of greater than 3 lbs/mm, a BET surface area of greater than 110 m2/g and a dispersion value between 2% and 10%.

14. The process according to claim 12, wherein the supported catalyst comprises a lobed support, and wherein the supported catalyst comprises about 0.01 weight percent to about 2.0 weight percent of a promoter selected from a group consisting of cerium, ruthenium, lanthanum, platinum, rhenium, gold, nickel or rhodium and a combination thereof.

15. The process according to claim 13, wherein the supported catalyst comprises a lobed support, and wherein the supported catalyst comprises about 0.01 weight percent to about 2.0 weight percent of a promoter selected from a group consisting of cerium, ruthenium, lanthanum, platinum, rhenium, gold, nickel or rhodium and a combination thereof.

* * * * *